United States Patent [19]

Eisenstein

[11] 4,336,685

[45] Jun. 29, 1982

[54] SYNTHETIC POLYMER FILMS AND FIBERS RENDERED PERMANENTLY ANTI-STATIC

[75] Inventor: Stephen E. Eisenstein, Oak Park, Mich.

[73] Assignee: BASF Wyandotte Corporation, Wyandotte, Mich.

[21] Appl. No.: 249,097

[22] Filed: Mar. 30, 1981

[51] Int. Cl.$^3$ .................... B29C 25/00; B29D 7/20; D02G 3/02; D02G 3/04
[52] U.S. Cl. ........................................ 57/238; 57/244; 57/256; 264/176 R; 264/176 F; 264/232; 264/238; 264/340; 525/167; 525/176; 525/177; 525/366; 525/368; 525/369; 525/371; 525/372; 525/425; 525/444
[58] Field of Search ............... 264/176 F, 232, 176 R, 264/238, 340; 525/167, 177, 176, 366, 368, 369, 371, 372, 425, 444; 57/238, 244, 256

[56] References Cited

U.S. PATENT DOCUMENTS

| | | |
|---|---|---|
| 3,734,874 | 5/1973 | Kibler et al. |
| 4,145,469 | 3/1979 | Newkirk et al. ............... 428/245 |
| 4,156,073 | 5/1979 | Login ............................. 528/295 |

FOREIGN PATENT DOCUMENTS 1541942 3/1979 United Kingdom .

*Primary Examiner*—James C. Cannon
*Attorney, Agent, or Firm*—Andrew E. Pierce

[57] ABSTRACT

Anti-static polymeric films, fibers and textile yarn produced by process comprising admixing a branched chain, sulfur-containing polyester with a synthetic film- or fiber-forming polymer, extruding said film or textile fiber, and exposing said film or textile fiber to an aqueous solution containing a polyvalent metal ion reactive with the sulfate groups present in said sulfur-containing polyester. The sulfur-containing polyester is thereby fixed within the synthetic film or fiber and is resistant to extraction by water or commonly used dry cleaning solvents.

19 Claims, No Drawings

SYNTHETIC POLYMER FILMS AND FIBERS RENDERED PERMANENTLY ANTI-STATIC

BACKGROUND OF THE INVENTION

1. Field of the Invention

This invention relates to anti-static film- and fiber-forming synthetic polymers.

2. Description of the Prior Art

The production of films, filaments, and fibers of linear synthetic polymers has long been known. One deficiency of hydrophobic synthetic polymers has been their resulting tendency to build up a static charge. When such filaments or fibers are utilized in the construction of fabrics or in the construction of carpeting, this deficiency is especially disadvantageous. Polyoxyalkylene polymers have been incorporated with film- and fiber-forming synthetic polymers prior to extrusion of the polymers into films and fibers in order to reduce the tendency of such films and fibers to develop a static charge. Such compositions have not proved entirely satisfactory since some of these compositions attract and retain soil more than the unmodified hydrophobic synthetic polymers. In addition, such modified hydrophobic synthetic polymers are more difficult to clean as a result of the presence of the polyoxyalkylene polymer.

In British Pat. No. 1,541,942 there is disclosed a process for the preparation of hydrophobic polyester films and fibers by a process wherein from 5 to 50% by weight, based upon the total weight of the mixture, of a water-soluble sulfonate group-containing polyester are added to a fiber-forming polyester, prior to the spinning operation. Subsequent to extrusion, the water-soluble sulfonate group-containing polyester is washed out of the fiber to leave voids in the fiber and thus produce polyester filaments and fibers having greater water retention capacity so that the tendency toward acquiring and retaining an electrostatic charge is reduced.

Branched water-dispersible polyesters are disclosed in U.S. Pat. No. 4,156,073 as prepared by reacting a polycarboxylic acid, a diol, and an aromatic carboxylic acid containing a —SO$_4$M grouping which is attached to the aromatic nucleus of said carboxylic acid through an aliphatic chain and ester linkge. It is further disclosed in U.S. Pat. No. 4,145,469, and references cited therein, that sulfonate or phosphate group-containing polyesters can be treated with an aqueous solution of a polyvalent metal ion reactive with said sulfonate or phosphate groups in said polyester in order to prepare a water-insoluble polyester product.

SUMMARY OF THE INVENTION

It has now been discovered that synthetic polymeric films and fibers can be provided having increased anti-static capacity. By the process of the invention, a mixture of a fiber- or film-forming synthetic polymer is made with a branched chain, sulfur-containing polyester. A film or textile fiber is extruded from said mixture and thereafter exposed to an aqueous solution containing a polyvalent metal ion reactive with the sulfate groups present in said sulfur-containing polyester. The films and fibers produced thereby are permanently anti-static and resistant to removal by water or commonly-used dry cleaning solvents.

DETAILED DESCRIPTION OF THE INVENTION

This invention relates to a process for increasing anti-static properties of hydrophobic synthetic polymeric films and fibers. The process comprises admixing a fiber- or film-forming synthetic polymer with about 5 to about 50% by weight, preferably about 10 to about 30% by weight, and most preferably about 15 to about 20% by weight, based upon the total weight of said hydrophobic synthetic polymer of a branched-chain sulfur-containing polyester having repeating carbon-oxy units and sulfate units wherein each of said units are an integral part of said polyester chain. Said polyester has a carboxylic acid number of about 10 to about 50, a molecular weight of about 4000 to about 30,000, preferably about 10,000 to about 20,000. Said sulfur-containing polyester comprises the reaction product of:

(a) at least one polycarboxylic acid, polycarboxylic acid anhydride or derivative thereof, (b) a diol, a polyglycol or mixtures thereof consisting of a poly(ethylene glycol) having the formula H(OCH$_2$CH$_2$)$_n$OH or a poly(methylene glycol) having the formula HO(CH$_2$)$_n$OH wherein n is an integer of from 2 to about 10, and (c) at least one monofunctional organic reactant which is the reaction product of an aromatic carboxylic acid having at least two carboxyl radicals or the anhydride or derivative thereof with an aliphatic or cycloaliphatic hydrocarbon hydroxysulfonic acid alkali metal salt, wherein said alkali metal salt is attached to the nucleus of said aromatic carboxylic acid through an aliphatic or cycloaliphatic chain and ester linkage.

These polyesters are more completely described in U.S. Pat. No. 4,156,073, incorporated herein by reference.

In preparing the sulfur-containing polyester compositions used in the invention, the necessary reactants can be added to a single reaction vessel equipped with condensing equipment to remove the water evolved during the formation of the polyester. The reaction conditions involve heating generally at a temperature of from about 150° C. to 200° C. over a time of about one hour to about eight hours. In a preferred preparation of the sulfur-containing polyester, an aromatic or aliphatic polycarboxylic acid or mixture thereof is added to the vessel, followed by the addition of less than a stoichiometric amount of an alkali metal salt of an hydroxysulfonic acid in combination with an aromatic acid anhydride such as phthalic or trimellitic anhydride. Upon heating for a period of about 15 to 60 minutes, preferably at a temperature of about 160° C. to about 170° C., the metallic salt of the hydroxysulfonic acid has preferentially and substantially reacted with the acid anhydride. Subsequently, the polyglycol component such as diethylene glycol is added to the reactor and the temperature slowly raised to 200° over a period of about 30 to 180 minutes to effect esterification of the mixture. The reaction is conducted under a nitrogen atmosphere or with a nitrogen sparge as is conventional in the preparation of polyesters. Upon the mixture reaching the desired acid number of about 10 to about 50, the mixture has changed in appearance from a fluid transparent liquid to one that is heavier bodied and slightly hazy. Subsequently, the polyester is poured out of the reactor and allowed to cool to a tough flexible plastic material.

The sulfur-containing polyester generally contains, based upon the sum of the theoretical mole percentages of the other acid components of said polyester, about 5 to about 50 mole percent of at least one organic reactant containing the —SO₃M group or mixtures thereof; about 95 to about 50 mole percent of at least one aromatic or aliphatic dicarboxylic acid or mixtures thereof and about 100 mole percent of at least one diol or polyglycol or mixtures thereof.

As described above, the preparation of the carboxylic acid or ester monomer of the invention which is used to impart dispersibility to the polyester of the invention involves the attachment to a carboxylic acid, anhydride or ester derivative thereof of an alkali metal sulfonate group through an aliphatic chain and ester linkage. This can be accomplished as described above by the in-situ esterification prior to polyesterification of an aromatic dicarboxylic acid, anhydride, acyl halide or ester derivative thereof with an hydroxysulfonic acid alkali metal salt. Suitable hydroxysulfonic metal salts can be prepared from the appropriate acids as described hereinafter and said metal salts correspond to the general formula:

HO—Q—SO₃M wherein Q is a bivalent aliphatic or cycloaliphatic saturated or unsaturated hydrocarbon radical having about 2 to about 8 carbon atoms and its valence bonds on different carbon atoms and which can contain halogen substitutents and in which M is an alkali metal. The hydroxysulfonic acids can be used in the form of their alkali metal salts such as the sodium, potassium, or lithium salts. These salts are readily prepared by neutralization of the sulfonic acid with an equivalent amount of an alkali metal hydroxide or alkali metal carbonate. Representative examples of hydroxyaliphatic and cycloaliphatic hydrocarbon sulfonic acids are as follows:
2-hydroxyethanesulfonic acid (isethionic acid),
2-hydroxyl-1-propanesulfonic acid,
1-hydroxy-2-propanesulfonic acid,
3-hydroxy-1-propanesulfonic acid,
2-hydroxy-1-butanesulfonic acid,
1-hydroxy-2-butanesulfonic acid,
3-hydroxy-2-butanesulfonic acid,
1-hydroxy-2-methyl-2-propanesulfonic acid,
2-hydroxy-2-methyl-1-propanesulfonic acid,
3-bromo-1-hydroxy-2-propanesulfonic acid,
3-bromo-2-hydroxy-1-propanesulfonic acid,
3-chloro-1-hydroxy-2-propanesulfonic acid,
3-chloro-2-hydroxy-1-propanesulfonic acid,
1-bromo-2-hydroxy-3-butanesulfonic acid,
1-bromo-3-hydroxy-2-butanesulfonic acid,
1-chloro-2-hydroxy-3-butanesulfonic acid,
1-chloro-3-hydroxy-2-butanesulfonic acid,
3-bromo-1-hydroxy-2-butanesulfonic acid,
3-bromo-2-hydroxy-1-butanesulfonic acid,
3-chloro-1-hydroxy-2-butanesulfonic acid,
3-chloro-2-hydroxy-1-butanesulfonic acid,
3-chloro-2-hydroxy-2-methyl-1-propanesulfonic acid,
1-chloro-3-hydroxy-2-methyl-2-propanesulfonic acid,
3-chloro-2-(chloromethyl)-2-hydroxy-1-propanesulfonic acid,
1-chloro-2-(chloromethyl)-3-hydroxy-2-propanesulfonic acid,
1-hydroxy-3-methoxy-2-propanesulfonic acid,
2-hydroxy-3-methoxy-1-propanesulfonic acid,
1-hydroxy-2-octanesulfonic acid,
1-hydroxy-2-dodecanesulfonic acid,
1-hydroxy-2-hexadecanesulfonic acid and
2-hydroxycyclohexanesulfonic acid.

The hydroxysulfonic acid salts are preferably reacted with a polyfunctional aromatic carboxylic acid anhydride or mixtures thereof. A proportion of the hydroxysulfonic acid salt is preferably utilized in the reaction so as to leave the sulfonate group-containing polyfunctional compound at least difunctional in order that the reaction product can be utilized as a monomer ester reactant in the preparation of a polyester which will function as a chain extender rather than a chain terminator as would be the case when the reaction product is monofunctional. However, sulfonate group-containing monofunctional monomers can be used where the amount of other trifunctional components is increased to compensate for the chain termination effect of such monomer. To illustrate, the reaction product of 0.23 mole of the sodium salt of isethionic acid (2-hydroxyethane sulfonic acid) with 0.23 mole trimellitic anhydride is a difunctional monomer reaction product which is suitable for further reaction with a diol or polyglycol to form the polyester compositions. Preferably, the mono- or difunctional reaction product is used in combination with other dicarboxylic acids which can be aromatic or aliphatic in order to obtain a suitable balance of physical properties in the polyester composition prepared by polyesterification of these ingredients; however, even though the hydroxysulfonic acid salt can form esters with all carboxylic acid containing molecules present, the net result on polymerization is a high molecular weight polyester.

In addition to the polycarboxylic acid component which is at least difunctional and to which the metallic sulfonate group is attached through an aliphatic chain and ester linkage, the polyester is prepared from other polycarboxylic acid components which can be any aliphatic, cycloaliphatic or aromatic polycarboxylic acid or mixtures thereof. Examples of such acids are phthalic, terephthalic, isophthalic, trimellitic, pyromellitic, oxalic, malonic, succinic, glutaric, adipic, pimelic, suberic, azelaic, sebacic, maleic, fumaric, 1,3-cyclopentane dicarboxylic, 1,2-cyclohexane dicarboxylic, 1,3-cyclohexane dicarboxylic, 1,4-cyclohexane dicarboxylic, 2,5-norbornane dicarboxylic, 1,4-naphthalic, diglycolic, thiodipropionic, and 2,5-naphthalene dicarboxylic acids. Suitable mixtures of these polycarboxylic acids can be utilized to obtain optimal physical properties in the polyester composition as is well known by those skilled in the art. The corresponding acid anhydrides, esters and acyl halides of the above enumerated polycarboxylic acids can also be used in preparing the polyester compositions.

The diol or polyglycol used in preparing the polyester antistatic agent composition of the invention can be a poly(ethylene glycol) having the generalized formula:

H(OCH₂CH₂)ₙOH or a poly(methylene glycol) having the generalized formula:

HO(CH₂)ₙOH wherein in each formula n is an integer of from 2 to about 10.

Examples of useful polyglycols include diethylene glycol, triethylene glycol, tetraethylene glycol, pentaethylene, hexaethylene, hepaethylene, octaethylene, nonaethylene, and decaethylene glycols, and mixtures thereof. The diol component can consist of aliphatic, alicyclic, and aralkyl glycols.

Examples of useful diols (glycols) include ethylene glycol; propylene glycol; 1,3-propanediol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol. Copolymers can be prepared from two or more of the above glycols.

The diol or polyglycol can also include a minor amount of a polyol which is essentially free from ethylenic unsaturation. Thus up to 20 mole percent of a polyol can be used to replace a portion of the diol component. The term "polyol" as used herein refers to an organic compound having more than two (2) hydroxyl groups per molecule as determined by the average of the hydroxyl groups per molecule. Representative polyols essentially free from ethylenic unsaturation are well known in the art. They are often prepared by the catalytic condensation of an alkylene oxide or mixture of alkylene oxides either simultaneously or sequentially with an organic compound having at least two active hydrogen atoms. Representative polyols include the polyhydroxy-containing polyesters, polyalkylene polyether polyols, alkylene oxide and adducts of polyhydric polythiol ethers.

Many types of hydrophobic synthetic polymers can be blended with the sulfur-containing polyester compositions. Synthetic fiber-forming polyesters prepared from linear polyesters as exemplified by poly(ethylene glycol terephthalate) based polyesters can be effectively rendered antistatic as well as other synthetic fiber-forming polymers such as polyamides, polyolefins, polyacrylates, and polyacrylamides. Spun or continuous filament fibers derived from fiber-forming synthetic polymers alone or in blends or with natural fibers such as cotton and wool can also be rendered antistatic. The preparation of such fiber-forming polymers is well known in the art. Additives, such as whiteners, dyes, and stabilizers can be incorporated into the fiber-forming polymer compositions as required.

In the process of the invention, a blend is made of a synthetic film- or fiber-forming polymer with the sulfur-containing polyesters disclosed herein. About 5 to about 50 percent by weight, based upon the total weight of said polymer of said sulfur-containing polyester is used in said blend. Thereafter, the blend is extruded to form a film or fiber and said film or fiber is exposed to an aqueous solution containing about 0.05 percent to about 2 percent by weight, based upon the total weight of said sulfur containing polyester present in said film or fiber, of a polyvalent metal ion reactive with the sulfate groups present in said sulfur-containing polyester. Such exposure of the film or fiber to the polyvalent metal ion aqueous solution results in insolubilization of the sulfur-containing polyester contained in said film or fiber, thus rendering the antistatic properties conferred on said film or fiber permanent. The insolubilization reaction can take place at ambient or elevated temperatures. The time for reaction corresponds to the time required for the polyvalent metal ion treating solution to contact the sulfur-containing polyester and thus may be longer where thick films or large denier fibers are exposed to said treating solution. Useful polyvalent metal ions which can be present alone or in mixtures are calcium ($Ca^{++}$), magnesium ($Mg^{++}$), aluminum ($Al^{+++}$), cobalt (cobaltous, $Co^{++}$ and cobaltic $Co^{+++}$), and ferric ($Fe^{++}$) ions. Such polyvalent metal ions can be derived, for instance, from the above metal halide salts, the above metal oxides, the above metal hydroxides, and the above metal carbonates.

The following examples will further illustrate the nature and the method of preparation of the polyester size compositions of the invention. These examples, however, are not to be considered as limiting the invention. In the specification, claims and the examples which follow, all parts, proportions, and percentages are by weight and all temperatures are in degrees centigrade unless otherwise noted.

EXAMPLE 1

A polyester was prepared as follows:

Into a 500 millimeter flask equipped with a heavy-duty constant torque stirring device, thermometer and thermometer well, sparge tube and vacuum distillation takeoff, said flask being heated by use of an oil bath, there was added 104 grams of isophthalic acid, 28 grams of azelaic acid, 34 grams of sodium isethionate (2-hydroxyethane-sulfonic acid, sodium salt), and 49 grams of trimellitic anhydride. Under a nitrogen sparge, the contents are heated to 149° C. at which temperature the mixture is liquid and uniform. The contents of the flask are slowly heated to 160° C. to 170° C. over a period of 25 to 35 minutes and thereupon 122 grams of diethylene glycol are added. The temperature is then slowly raised to 200° C. over a period of 45 to 120 minutes and the mixture allowed to polymerize for two to three hours subsequent to the addition of catalyst. Upon the approach of completion of polymerization as indicated by the quantity of distillate collected and by the increased viscosity and slightly hazy appearance of the material in the flask, the sparge tube is removed and the pressure is slowly reduced to less than 5 millimeters of mercury. The temperature is then raised to 220° C. After one hour under full vacuum of less than 5 millimeters of mercury, the mixture has changed from a rather fluid transparent liquid to a hazy viscous material. The vacuum is then relieved with nitrogen and the contents poured out onto a sheet of Teflon plastic. Upon cooling the polyester obtained is tough and flexible and suitable for admixture with film- and fiber-forming polymers. In order to produce a powdered material suitable for extrusion, the cooled polyester is chilled below 0° C. and crushed into a fine powder using a heavy-duty dough blender.

EXAMPLES 2 AND 3

Following the procedure and proportions of Example 1, polyester compositions are prepared substituting in turn for the sodium isethionate, 2-hydroxy-1-propane-sulfonic acid, sodium salt and 1-hydroxy-2-propane-sulfonic acid, sodium salt. All other materials are the same as in Example 1. Polyesters useful in admixture with film- or fiber-forming polymers are obtained.

EXAMPLES 4, 5 AND 6

The procedure of Example 1 is repeated using the same materials and proportions of materials except that for the diethylene glycol of Example 1 there is substituted in turn ethylene glycol, triethylene glycol and propylene glycol. Useful polyesters are obtained.

EXAMPLE 7

The sulfur-containing polyester of Example 1 is granulated and 30 parts thereof is thoroughly mixed with 70 parts by weight of a poly(ethylene glycol terephthalate) fiber grade polymer granulate. The resultant mixture is dried and delivered through an extruder where it is melt spun into filaments at a temperature of 285° C. with a residence time in the extruder of about 7 minutes. The filaments produced are bundled to form a tow which is drawn at a ratio of 1:3.7 first in a drawing bath at 78° C. and then in a steaming duct at 158° C. The filaments are then passed through a 0.1 percent by weight aqueous solution of calcium chloride and thereafter dried at ambient temperature. The fibers produced show greater antistatic properties than fibers prepared from poly(ethylene glycol terephthalate) fiber grade polymer granulate.

While this invention has been described with reference to certain specific embodiments, it will be recognized by those skilled in the art that many variations are possible without departing from the scope and spirit of the invention.

The embodiments of the invention in which an exclusive privilege or property is claimed are defined as follows:

1. The process of producing a synthetic polymer film or textile fiber or filament having improved antistatic properties by the steps comprising:
   (A) admixing a hydrophobic, film- or fiber-forming synthetic polymer with about 5 to about 50 percent by weight, based upon the total weight of said polymer, of a sulfur-containing polyester containing repeating carbonyl-oxy units wherein said units are an integral part of the polymer chain, said polyester comprising the reaction products of (1) a diol or polyglycol, (2) a polycarboxylic acid, and (3) an organic reactant containing a metal salt of a sulfonic acid attached to an aromatic nucleus through an aliphatic or cycloaliphatic chain and ester linkage, said sulfur-containing polyester containing about 5 mole percent to about 50 mole percent, based upon the sum of the theoretical mole percentages of the other carboxylic acid components of said polyester, of at least one organic reactant containing the alkali metal sulfonate group, wherein said organic reactant consists of the at least monofunctional reaction product of an aromatic polycarboxylic acid, anhydride, or derivative thereof and an aliphatic or cycloaliphatic hydrocarbon hydroxysulfonic acid metal salt to form an extrudable mixture, thereafter
   (B) extruding a film or textile fiber, and subsequently
   (C) exposing said film or textile fiber to an aqueous solution containing about 0.05% to about 2% by weight, based upon the total weight of said sulfur-containing polyester present in said film or textile fiber, of a polyvalent metal ion reactive with the sulfate groups present in said sulfur-containing polyester.

2. The process of claim 1 wherein said sulfur-containing polyester is the reaction product of
   (A) at least one polycarboxylic acid, polycarboxylic acid anhydride, or derivative thereof,
   (B) a diol or polyglycol or mixtures thereof consisting of a poly(ethylene glycol) having the formula:

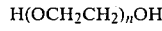
   H(OCH$_2$CH$_2$)$_n$OH or a poly(methylene glycol) having the formula:

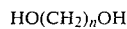
   HO(CH$_2$)$_n$OH wherein n is an integer of from 2 to about 10, and
   (C) at least one monofunctional organic reactant which is the reaction product of an aromatic polycarboxylic acid having at least two carboxyl radicals or the anhydride or ester derivative thereof with an aliphatic or cycloaliphatic hydrocarbon hydroxysulfonic acid alkali metal salt wherein said alkali metal salt is attached to the nucleus of said aromatic carboxylic acid through an aliphatic or cycloaliphatic chain and ester linkage.

3. The process of claim 2 wherein said hydroxysulfonic acid metal salt has the formula:

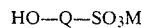
   HO—Q—SO$_3$M wherein Q is a bivalent hydrocarbon radical and M is an alkali metal.

4. The process of claim 3 wherein said metal ion is sodium and Q is aliphatic of about 2 to about 8 carbon atoms.

5. The process of claim 4 wherein said aromatic polycarboxylic acid or anhydride is selected from the group consisting of trimellitic acid or anhydride and pyromellitic acid or anhydride.

6. The process of claim 5 wherein said polycarboxylic acid comprises a mixture of isophthalic acid and azelaic acid; said hydroxysulfonic acid metallic salt comprises a salt selected from the group consisting of 2-hydroxyethanesulfonic acid, sodium salt; 2-hydroxy-1-propanesulfonic acid sodium salt; and 1-hydroxy-2-propanesulfonic acid, sodium salt and said polyglycol comprises diethylene glycol.

7. The process of claim 1 or 2 wherein said hydrophobic synthetic polymer is a poly(ethylene glycol terephthalate).

8. The process of claim 1 or 2 wherein said hydrophobic synthetic polymer is selected from the group consisting of a polyamide, a polyolefin, a polyacrylate, a polyacrylamide, and mixtures thereof.

9. The process of claim 1 or 2 wherein said branched-chain sulfur-containing polyester is present in said extrudable mixture in the proportion of about 10 to about 30% by weight based upon the total weight of said synthetic polymer.

10. The process of claim 1, 2 or 6 wherein said polyvalent metal ion is selected from the group consisting of at least one of Ca$^{++}$Co$^{30+}$, Co$^{+++}$, Al$^{+++}$, Mg$^{30+}$, and Fe$^{+++}$ ions.

11. An antistatic film or textile fiber, filament or yarn which is the product of the process of claims 1, 2, or 6.

12. An antistatic textile yarn comprising the antistatic synthetic polymeric fiber produced by the process of claim 10 wherein said yarn is prepared from spun or continuous filament fiber selected from the group consisting of at least one of poly(ethylene glycol terephthalate), polyolefin, polyamide, polyacrylate, and polyacrylamide; or said fiber in combination with a natural fiber consisting of at least one of cotton and wool.

13. An extrudable mixture comprising a film- or fiber-forming, hydrophobic synthetic polymer in admixture with about 5 to about 50% by weight based upon the weight of said polymer of a branched-chain, sulfur-containing polyester containing repeating carbonyl-oxy units and sulfate units wherein each of said units are an integral part of said polyester chain, and wherein said polyester is the reaction product of
- (A) at least one polycarboxylic acid, polycarboxylic acid anhydride, or derivative thereof,
- (B) a diol or polyglycol,
- (C) at least one monofunctional organic reactant which is the reaction product of an aromatic carboxylic acid having at least two carboxyl radicals or the anhydride or ester derivative thereof with an aliphatic or cycloaliphatic hydrocarbon hydroxysulfonic acid alkali metal salt wherein said alkali metal salt is attached to the nucleus of said aromatic carboxylic acid through an aliphatic or cycloaliphatic chain and ester linkage.

14. The extrudable mixture of claim 13 wherein said hydrophobic synthetic polymer is a poly(ethylene glycol terephthalate).

15. The extrudable mixture of claim 13 wherein said hydrophobic synthetic polymer is selected from the group consisting of a polyamide, a polyolefin, a polyacrylate, a polyacrylamide, and mixtures thereof.

16. The extrudable mixture of claim 13 wherein said branched-chain sulfur-containing polyester is present in said extrudable mixture in the proportion of about 10 to about 30% by weight based upon the weight of said hydrophobic synthetic polymer.

17. The extrudable mixture of claim 13 wherein said reaction product of an aromatic carboxylic acid and an aliphatic or cycloaliphatic hydrocarbon hydroxysulfonic acid alkali metal salt is the reaction product of a polycarboxylic acid or anhydride selected from the group consisting of trimellitic acid or anhydride and pyromellitic acid or anhydride and a hydroxysulfonic acid metal salt having the formula $$HO-Q-SO_3M$$

wherein Q is a bivalent hydrocarbon radical and M is an alkali metal.

18. The extrudable mixture of claim 17 wherein said branched-chain, sulfur-containing polyester is prepared utilizing said hydroxysulfonic acid wherein said metal is sodium and Q is aliphatic chain of about 2 to about 8 carbon atoms.

19. The extrudable mixture of claim 18 wherein said polycarboxylic acid comprises a mixture of isophthalic acid and azelaic acid, said hydroxysulfonic acid metallic salt comprises a salt selected from the group consisting of 2-hydroxyethanesulfonic acid, sodium salt; 2-hydroxy 1-propanesulfonic acid, sodium salt; and 1-hydroxy-2-propanesulfonic acid, sodium salt; and said polyglycol comprises diethylene glycol.

* * * * *